United States Patent [19]
Ha

[11] Patent Number: 5,078,121
[45] Date of Patent: Jan. 7, 1992

[54] DEVICE FOR ADJUSTING REFLECTING ANGLES OF GRILL REFLECTORS IN A GAS OVEN RANGE

[75] Inventor: Dae J. Ha, Kangwon-Do, Rep. of Korea

[73] Assignee: Samsung Electronics Co., Ltd., Suweon, Rep. of Korea

[21] Appl. No.: 696,159

[22] Filed: May 6, 1991

[30] Foreign Application Priority Data

May 18, 1990 [KR] Rep. of Korea ............... 90-6685[U]

[51] Int. Cl.⁵ ..................... A47J 37/00; F24C 3/00
[52] U.S. Cl. .................. 126/41 R; 126/19 R; 126/273 R; 219/405; 99/447
[58] Field of Search ............ 126/19 R, 20, 41 R, 126/39 K, 21 R, 92 B, 39 R, 39 D, 273 R, 274; 219/405, 461; 99/447, 401

[56] References Cited

U.S. PATENT DOCUMENTS

| | | | |
|---|---|---|---|
| 1,491,570 | 4/1924 | Thornblade | 126/41 R |
| 1,667,988 | 5/1928 | Richardson | 126/41 R |
| 2,844,702 | 7/1958 | Staats | 219/405 |
| 4,020,323 | 4/1977 | Dills | 126/41 R |
| 4,416,249 | 11/1983 | Reynolds | 126/41 R |
| 4,627,410 | 12/1986 | Jung | 126/19 R |

Primary Examiner—James C. Yeung
Attorney, Agent, or Firm—Burns, Doane, Swecker & Mathis

[57] ABSTRACT

The device adjusts reflecting angles of grill reflectors for a grill burner in a gas oven range. Rotation of a driving means 21 is transmitted through a transmission means 17 to an adjusting means 16 and converted into a linear movement of bearing means 13 in reflecting plate 10A and 10B hingedly mounted on a hinge pin 11, thereby the angle between the plates 10A and 10B is adjusted.

6 Claims, 4 Drawing Sheets

DEVICE FOR ADJUSTING REFLECTING ANGLES OF GRILL REFLECTORS IN A GAS OVEN RANGE

BACKGROUND OF THE INVENTION

1. Field of the Invention

This invention relates to a device for adjusting refecting angles of grill reflectors for a grill burner in a gas oven range, and more particularly to a device which adjusts reflecting angles of grill reflectors in a gas oven range, especially of an upward exhausting type, depending on the nature and sizes of objects for cooking to improve the thermal efficiency of a grill burner.

2. Description of the Related Art

Heretofore, these kinds of device have been known in Japanese Utility Model Laid-Open No. Sho 63-159108(10.18.1988), which has disclosed a heating cooker including a reflecting angle adjusting aquipment for adjusting shapes of reflectors for a heater using an electronical remote control, and in Japanese Utility Model Laid-Open No. Pyong 1-58006(4.11.1989), which has disclosed a heating cooker including heaters disposed in a lower and upper room of cooking shelves respectively, and reflectors disposed under the lower heater and above the upper heater, respectively, and made of a shape-memory alloy changeable depending on the temperature of the heating rooms.

In the conventional technologies, there had been defects that it was difficult to control finely the desired reflector angle, and that the reflector angle was adjusted depending on the temperature of the heating rooms regardless of the natures and sizes of objects for cooking, so that the thermal absorption efficiency of the objects is deteriorated.

SUMMARY OF THE INVENTION

Accordingly, the object of the invention is to provide an adjusting device which can adjust finely the desired reflecting angles of the reflecting plates within a wide angle range.

Another object of the invention is to provide an adjusting device which can adjust the reflecting angles of the refecting plates depending on natures and sizes of objects to improve thermal absorption efficiencies of the objects.

Accorfing to the invention, in order to make up for the above-stated defects, there is provided a device comprising:

a bearing means supported in each of said reflecting plates and having a hole therethrough provided with a female thread;

a holding means fixedly mounted on each of said reflecting plates to hold freely rotatably said bearing means;

an adjusting means being rotatable and having thread portions which are formed in both end regions thereof respectively, and are interacting with said threads of said bearing means to turn said reflecting plates a round said common hinge pin;

a transmission means cooperated with said adjusting means; and a driving means cooperated with said transmission means to rotate said adjustimg means, thereby the angle between said reflectimg plates supported by said bearing means is varied.

BRIEF DESCRIPTION OF DRAWINGS

The invention will now be further described, by way of examples, with reference to the accompanying drawings, in which.

DESCRIPTION OF THE PREFERRED EMBODIMENT

Figure 1:
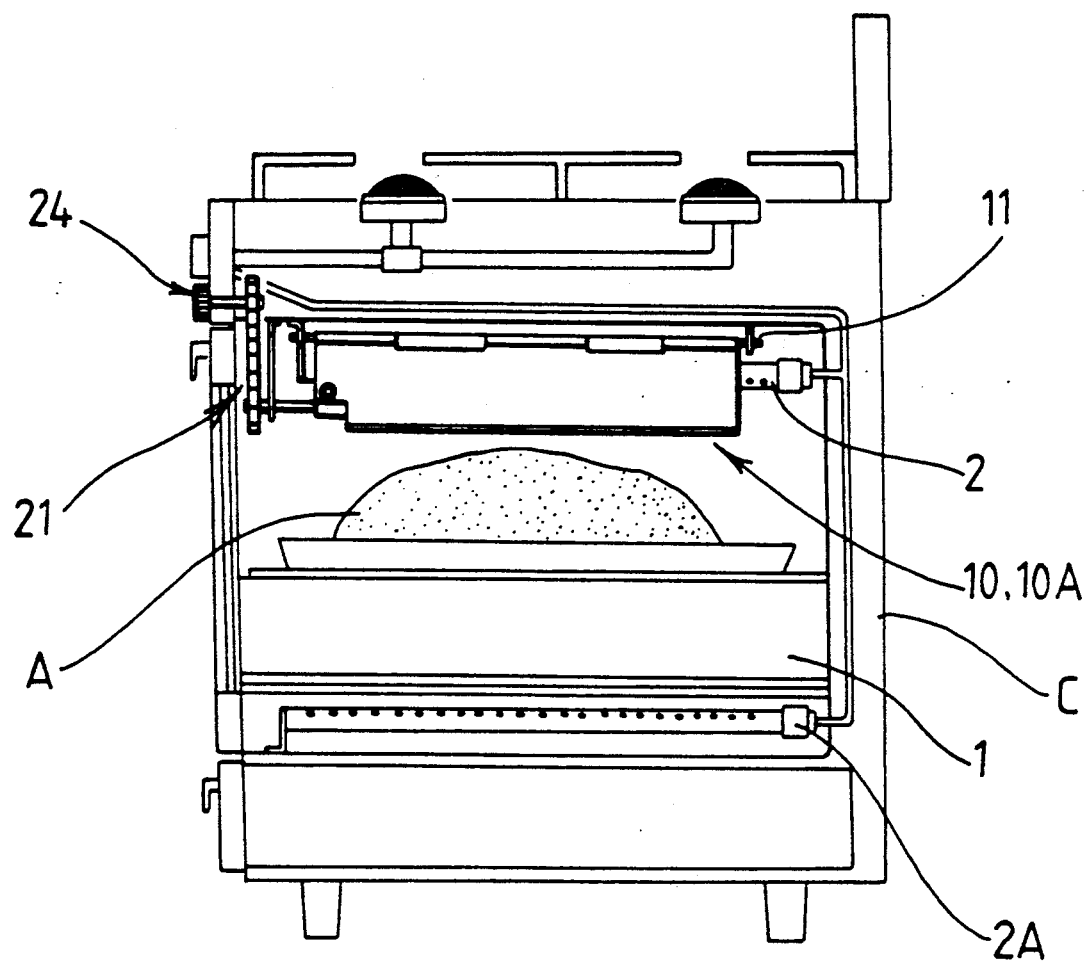
FIG. 1 is a schematic view showing a gas oven range with a device for adjusting reflecting angles of grill reflecting plates according to the invention.

In FIG. 1, a gas oven range is schematically showing an adjusting device of reflecting angles of grill reflecting plates according to an embodiment of this invention. An object A for cooking is lying on a shelf in an oven room 1 which is formed in the casing C of the oven range and is provided with two grill burners 2 and 2A in the upper and lower part thereof respectively. Just above the grill burner 2, a pair of reflecting plates 10A and 10B is hingedly mounted on the ceiling of the oven room 1 by a common hinge pin 11.

Figure 2:
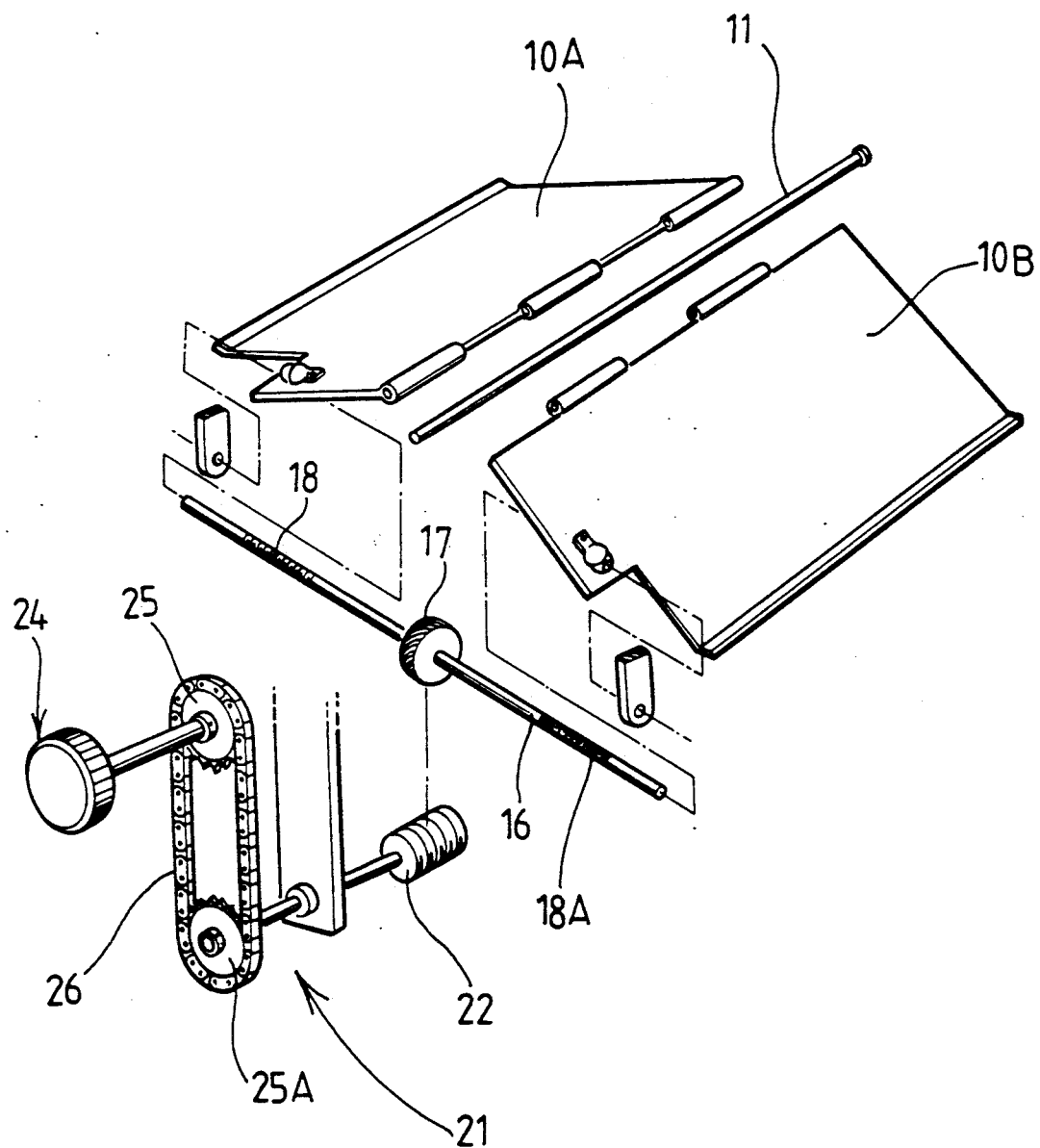
FIG. 2 is an exploded perspective view of the device for adjusting the reflecting angles of the grill reflecting plates according to the invention.
Figure 3:
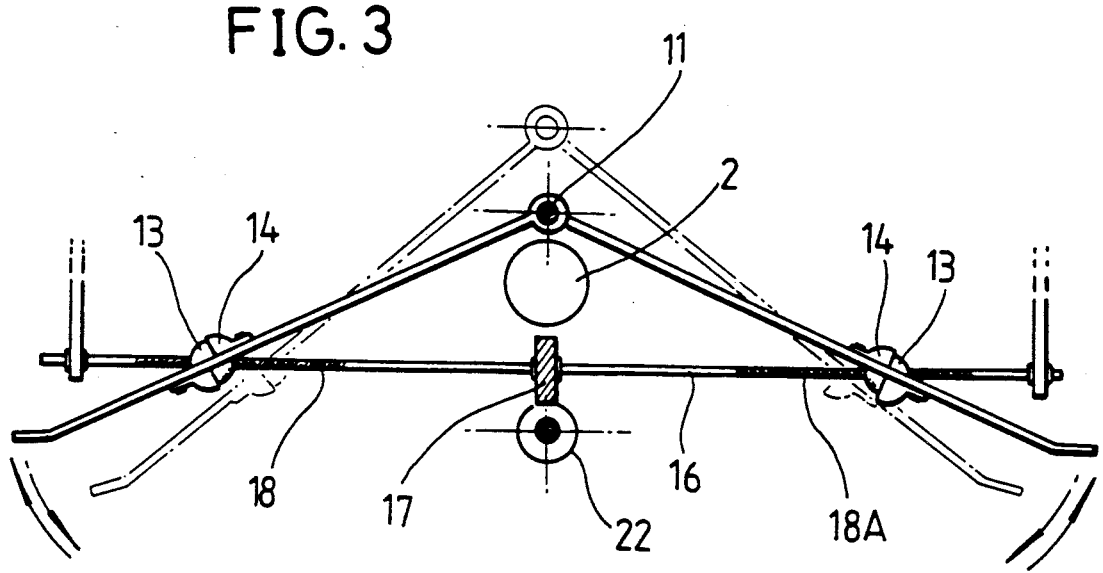
FIG. 3 is a front view, in assembled state, showing the device for afjusting the reflecting angles of the grill reflecting plates.

FIGS. 2 and 3 show the adjusting device of the reflecting angles of the grill reflecting plates 10A and 10B according to the invention, in an exploded perspective view and an enlarged assembled front view respectively. The adjusting device comprises a bearing means 13, a holding means 14, an adjusting means 16, a transmission means 17 and a driving means 21.

Figure 4:
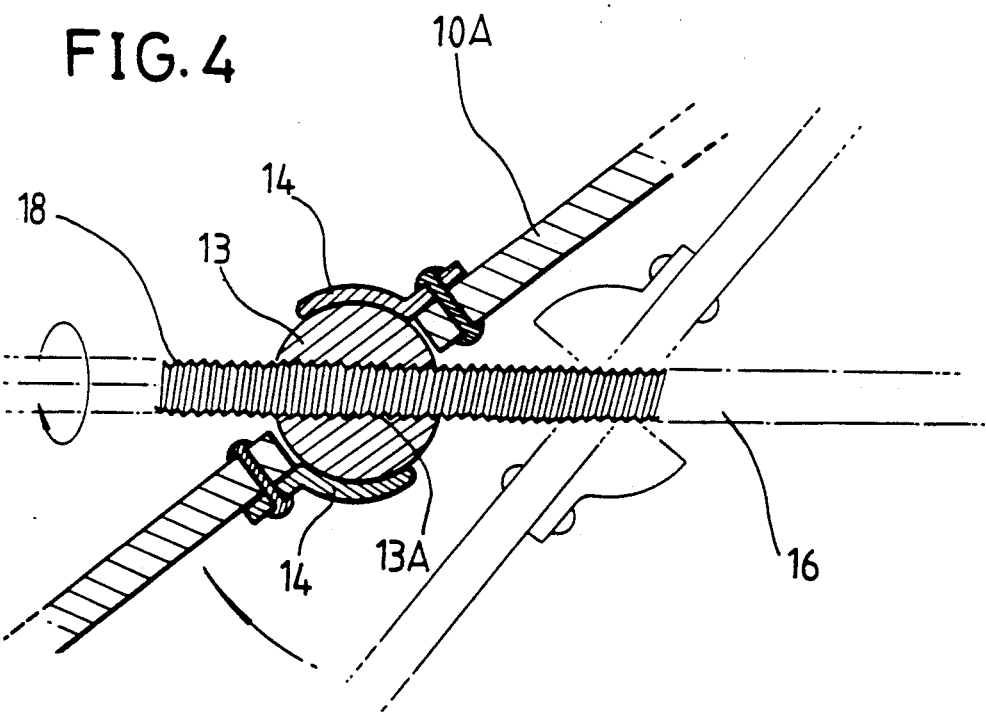
FIG. 4 is an a enlarged partial sectional view of a portion of a bearing means into reflecting plates cooperated with a adjusting means.

The bearing means 13 having globular shape and disposed in an opening formed in each of the reflecting plates 10a and 10B is rotatably held in the holding means 14, which has correspondingly globe-shaped inner surfaces and is fixedly mounted on each of the reflecting plates 10A and 10B by screws, rivets and the like. That is, the bearing means 13 is partially enclosed with the holding means 14 and is freely rotatable therein to some extent, as shown in FIG. 4

Moreover, the bearing means 13 has a hole therethrough provided with a female thread 13A interacting with a male thread 18 to be mentioned later of the adjusting means 16. Preferably, these threads are formed with square or Acme thread profile suitable to transmit power.

The adjusting means 16 of a elongated round bar is supported by the casing C and have male thread portions 18 and 18A of prescribed length of the both end regions thereof respectively. As above-mentioned, the threads 18 and 18A cooperate with one bearing 13 supported in the reflecting plates 10A or 10B and the other thread with the other bearing 13. Here, the thread portions 18 and 18A are threaded in the opposite direction to each other, that is, one is made according to the right-hand rule and another according to the left-hand rules, so that their rotation moves the bearings 13 in the reflector plates 10A and 10B in the opposite direction to each other. Accordingly, when the adjusting means 16 is rotated, the reflecting plate 10A and 10B supporting the bearing means 13 are turned a round the common hinge pin 11 in the opposite direction to each other to adjust the angle between the reflector plates 10A and 10B.

The transmission means 17 consists of a worm wheel which is fixedly mounted on the middle region of the adjusting means 16 by a interference fit or by a key means or any other fittings. The transmission means 17, however, may be formed integrally with the adjusting means 16.

The driving means 21 transmits external power to the transmission means 17. For this purpose, the driving means 21 comprises a knod 24 for operating af the exterior of the casing C, a driving sprocket wheel 25 disposed on an extended axis of the knob 24, a driven sprocket wheel 25A, a chain 26 between the driving sprocket wheel 25 and the driven sprocket wheel 25A, and a worm 22 desposed on an extended axis of the driven sprocket wheel 25A and engaged with the worm gear 17.

Figure 5:
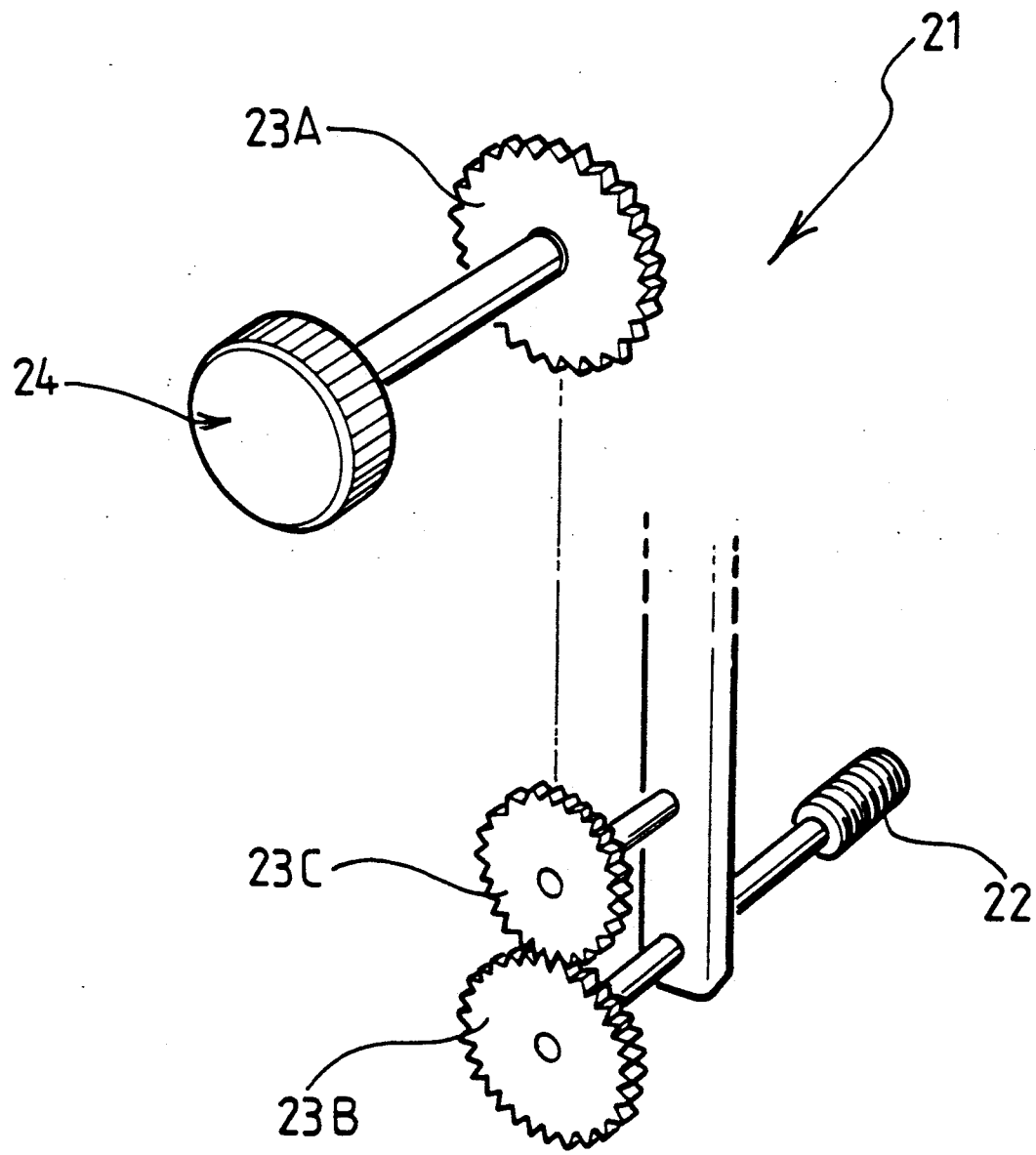
FIG. 5 is an exploded perspective view showing another embodiment of a transmission means, being different from that in FIG. 1.

Alternatively, the driving means 21 may comprise a gear 23A, a pinion 23B and an idle gear 23C in lieu of the two sprocket wheels 25 and 25A and the chain 26, as shown in FIG. 5.

The adjusting device of the reflecting angles of the refecting plates 10A and 10B according to the invention, having the construction as described above, is operated as follows:

When the knob 24 is rotated by an exterior operation the rotation is transmitted through the components 25, 26, 25A and 22, 23A, 23B, 23C and 22 of the driving means 21 to the transmission means or worm gear 17 to rotate the adjusting means 16. At the same time, the bearing means 13, whose threads 13A are engaged with the threads 18 and 18A of the adjusting means 16, respectively carry out a linear movement. Here, since the thread portions 18 and 18A are adversely threaded to each other, the bearings 13 supported by the reflecting plates 10A and 10B get near or away from each other, and the angle between the reflecting plates 10A and 10B is adjusted. To this end, the bearings 13 are provided to be self-aligned in the holding means 14 holding freely rotate them therein.

As described above, the adjusting device according to the invention allows the refecting angles of the grill reflectors in a gas oven range to be finely adjusted depending on the nature and sizes of objects for cooking to improve the thermal efficiency of the grill burner.

What is claimed is:

1. A device for adjusting a reflecting angles of a grill reflecting plates in a gas oven range including a casing, an oven room for objects for cooking, upper and lower grill burners disposed in said oven room, and two or more grill reflecting plates constituting a pair of wings and hingedly mounted on the ceiling of said oven room by a common hinge pin, comprising:
    a bearing means supported in each of said reflecting plates and having a hole therethrough provided with a female thread;
    a holding means fixedly mounted on each of said reflecting plates to hold freely rotatably said bearing means;
    an adjusting means being rotatable and having thread portions which are formed in both end regions thereof respectively and are interacting with said threads of said bearing means to turn said reflecting plates around said common hinge pin;
    a transmission means cooperated with said adjusting means; and
    a driving means cooperated with said transmission means to rotate said adjusting means, thereby the angle between said reflecting plates supporting said bearing means is adjusted.

2. The device according to claim 1, wherein said bearing means have a globular shape and are provided to carry out a linear movement in an opposite direction to each other and self-align in the holding means along a rotation of the adjusting means.

3. The device according to claim 1, wherein said transmission means comprises a worm gear secured on said adjusting means.

4. The device according to claim 1, wherein said driving means comprises a knob for operating from exterior, a driving sprocket wheel disposed on an extended axis of said knob, a driven sprocket wheel, a chain between said driving sprocket wheel and said driven sprocket wheel and engaged with said worm gear of said transmission means.

5. The device according to claim 1, wherein said driving means comprises a knob for operating from an exterior, a driving gear disposed on an extended axis of said knob, a driven gear, an idle gear between said driving gear and said driven gear, and a worm disposed on an extended axis of said driven gear and engaged with said worm gear of said transmission means.

6. The device according to claim 1, wherein said thread portions of said adjusting means are threaded in an opposite direction to each other.

* * * * *